(No Model.)
J. J. FAULKNER.
MACHINE FOR CLEANING COTTON SEED.
No. 558,680. Patented Apr. 21, 1896.
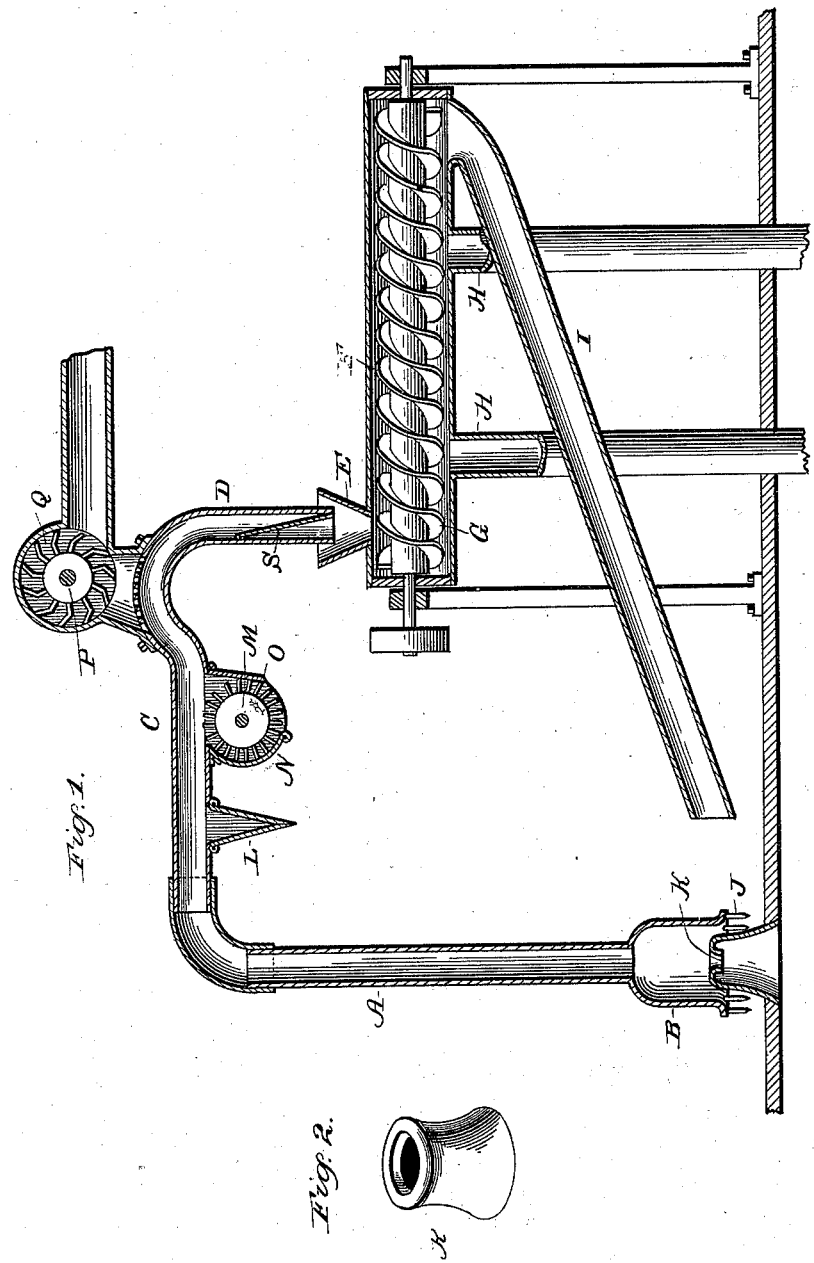
Witnesses
Victor J. Evans.
O. W. Braituray
Inventor
James J. Faulkner.
by E. W. Marble Sons.
Attorneys

United States Patent Office.

JAMES J. FAULKNER, OF MEMPHIS, TENNESSEE, ASSIGNOR, BY DIRECT AND MESNE ASSIGNMENTS, TO THE STANDARD COTTON SEED COMPANY, OF ARKANSAS.

MACHINE FOR CLEANING COTTON-SEED.

SPECIFICATION forming part of Letters Patent No. 558,680, dated April 21, 1896.

Application filed July 2, 1895. Serial No. 554,749. (No model.)

*To all whom it may concern:*

Be it known that I, JAMES J. FAULKNER, a citizen of the United States, residing at Memphis, in the county of Shelby and State of Tennessee, have invented certain new and useful Improvements in Machines for Cleaning Cotton-Seed; and I do hereby declare the following to be a full, clear, and exact description of the invention, such as will enable others skilled in the art to which it appertains to make and use the same.

My invention relates to improvements in machines for treating cotton-seed, and particularly to improvements in that class thereof which are designed to free the seed from the foreign substances present therein as it is bought in the open market, and which may be termed, therefore, "cotton-seed cleaners;" and it consists in the improved cotton-seed cleaner whose construction and arrangement of parts will be hereinafter fully described, and particularly pointed out in the claims.

Cotton-seed, in the condition in which it can be bought, is mixed with a great variety of foreign substances which would be injurious to a cotton-seed delinter should they be fed to the same together with the seed. Iron, stones, nails, pieces of brick, and many other like substances are always to be found mixed with cotton-seed as it is bought. It is necessary to free the seed from such foreign substances before it is subjected to the action of the abrading operation, as any one of such substances, if fed to the delinter along with the seed, would be apt to injure the abrading-surfaces of the delinter and render necessary the complete shutting down of the machine. Vexatious delays often arise from this cause.

Heretofore the seed has usually in practice been freed from the foreign substances which are found therewith by first passing the seed through a revolving sieve and next passing the seed over a magnet-plate. In this manner the stones, pieces of brick, spikes, nails, and other foreign substances which are found with the seed are removed and the seed is placed in a proper condition to be subjected to the delinting operation. This method of freeing the seed from foreign substances has been used for several years, but while it is in the main satisfactory it does not afford a complete and perfect separation in all cases of foreign substances from the seed, and the consequence is that the abrading-surfaces of the cotton-seed delinters are frequently broken by spikes and nails which manage to find their way into the machine.

The object of my present invention is to provide a means for freeing the cotton-seed from the foreign substances which are found in connection with the same, which will be perfectly certain in its action and render it impossible for any injurious foreign substances to be present with the seed after it has been passed through the cleaner. Pneumatic means is the most available for accomplishing this purpose. It has been hitherto resorted to, as is illustrated by the prior art, in two ways. First, the seed has been blown from the discharge-spout and a separation by gravity effected, the seed, being lighter than the foreign substances, reaching a platform from which it is fed to the delinter and the stones and iron falling to the ground; second, the seed has been drawn up a conveyer-tube by a strong upward draft produced therein, and thus the separation of the seed from foreign substances effected.

In my present invention I effect the separation of the seed from the foreign substances by pneumatic means, but in a manner differing from those which I have mentioned. I make use of a pneumatic tube having a flaring mouth, which tube is formed with two bends before the discharge-opening is reached. The air-current produced in the tube by a suitably-journaled exhaust-fan is sufficient to draw the seed up the tube as soon as it has passed through the mouth of the same with great rapidity; but the flaring mouth of the tube results in a decreased air-draft at the bottom of the same, which, while sufficient to draw upward the seed, is not sufficient to draw upward stones, iron, nails, spikes, and other foreign substances usually there present. At this point, therefore, the separation of the foreign substances from the seed takes place, the foreign substances falling into a receptacle, which I place centrally in the flaring mouth of the pneumatic tube. In order to effect a further separation from the seed of any foreign substances which may have been carried with it up the pneumatic tube, I provide on the bottom of the first bend of the tube, which preferably lies horizontally, suction-valves adapted to open by inward pressure. The seed being lighter than the foreign substances naturally will pass through the top of the bend in the pneumatic tube, while the foreign substances moving along the bottom of the same will naturally fall into the discharge valved openings and be removed from the tube.

To further effect a separation from the seed of such loose dirt as is not ground into the same so as to be inseparable except through the delinting operation, I form perforations at the end of the first bend in the pneumatic tube on the upper side thereof and station outside of this opening in a suitable air-flume an exhaust-fan which produces an upward draft through the tube. The fine dirt and dust separable from the seed are drawn through these perforations, and so the seed as it escapes into the second downward bend of the tube is freed from the heavy foreign substances and from a greater portion of the dirt which was present therein and falls through a valved opening either directly into the feed stand-pipe or into a trough through openings formed in the bottom of which the seed is fed to one or more machines.

My invention is fully illustrated in the drawings which accompany and form a part of this application, in which the same reference-letters refer to the same or corresponding parts, and in which—

Figure 1 represents my improved cotton-seed cleaner. Fig. 2 is a detail perspective view showing the dirt-receptacle.

Referring to the drawings, A represents the pneumatic tube, which is formed with a flaring mouth B, a horizontal bend C, and a downward bend D. In the construction shown in the drawings the discharge end of the pneumatic tube opens into the feed-spout E of the conveyer-trough F, through which the seed falling therein is fed by an agitator G to the feed-spouts H of one or more delinters. If there is any excess of seed, such excess is carried by the tube I, connected with the discharge end of the conveyer-trough, to a point near the flaring mouth of the pneumatic tube, from whence it may be again carried over the feed-openings of the delinters connected with the conveyer-trough.

The flaring mouth B of the pneumatic tube is shown in the drawings as bell-shaped, though this form is not essential. The seed to be cleaned is fed to the bottom of the flaring mouth, which is supported a few inches over the floor. Large masses of seed are prevented from entering the mouth by the spikes J, which extend a short distance downward from the periphery of the flaring mouth. The seed, as soon as it is subjected to the suction of the air-current in the flaring mouth, is drawn upward to the body of the pneumatic tube, and is then sucked rapidly through the same by the increased air-current which is present in the tube. The draft at the bottom of the flaring mouth is not sufficient, however, to raise heavy foreign substances into the body of the pneumatic tube, but such foreign substances remain in a heap in the middle of the flaring mouth and fall through the central opening in the receptacle K, which is placed centrally in the mouth of the pneumatic tube. The seed itself, as it is carried up the tube, may still have present with it some foreign substances heavier than itself. To effect the removal of these, suction-valves are provided in the bottom of the horizontal bend C of the tube. In the drawings two constructions are shown for the suction-valves. The valve L is composed simply of two swinging plates pivoted to the bottom of the tube and held together by the force of the air-suction. Any foreign substances carried along with the seed, which are heavier than the seed, will naturally drag along the bottom of the horizontal portion of the pneumatic tube, and will fall into the pocket formed by the valve-plates L, forcing said plates to open and permit their discharge. The seed, as it is carried farther along the horizontal bend of the pneumatic tube, passes the paddle-roller M, which is journaled so that the paddles formed on the same project slightly into the tube. On one side of this roller a segmental casing N is formed, and on the other side a vacuum valve-plate O is provided, which normally is drawn closely against the paddles of the roller by the suction which exists in the pneumatic tube. In this manner considerable loss of air-pressure in the pneumatic tube is avoided, and at the same time the removal of the foreign substances is made much easier, clogging thereof in the casing of the paddle-roller M being prevented.

After passing the second valve-opening the seed is presumably free from any heavy foreign substances, but there is still present therein large quantities of dirt which is not ground into the seed so as to be incapable of removal therefrom except through the delinting operation. To effect the removal of such loose dirt, the upper side of the pneumatic tube is perforated near the end of the horizontal bend. An exhaust-fan P, mounted in the air-flume Q, is stationed outside of the perforations R thus formed and draws the loose dirt upward into the exhaust-flume as the seed passes the perforated portion of the pneumatic tube. The perforations are too small, however, to permit the discharge of the seed itself, so that the seed falls into the downward bend D of the pneumatic tube, presses open the vacuum-valve S formed therein, and is discharged, in the manner hereinbefore described, into the feed-spout E of the conveyer-trough F. The function of the valve S is to prevent upward air-suction through this end of the tube and thus a divided draft in the pneumatic tube.

The operation of my cotton-seed cleaner is as follows: Seed is fed to the flaring mouth B of the pneumatic tube A and is drawn upward through the tube by the air-current caused to exist in said flaring mouth by the action of the exhaust-fan P. The air-current in the flaring mouth is, however, not sufficiently powerful to draw upward the heavy foreign substances which are present with the seed, such foreign substances falling into the receptacle K and being discharged at any point desired. Masses of the seed are prevented from clogging the opening of the flaring mouth by the downwardly-hanging spikes J. Any foreign substances which are heavier than the seed escape from the pneumatic tube through the valves L and M. Loose dirt is separated from the seed through the perforations L, the seed falling in a cleaned condition through the downward bend B of the pneumatic tube into the receptacle provided therefor.

Having thus fully described my invention, what I claim as new, and desire to secure by Letters Patent, is—

1. In a cotton-seed cleaner, the combination with a vertically-arranged tube, having an expanded mouth, and means for producing an upward current of air therein, of a dirt-receptacle K, having an opening in its top, placed under the expanded mouth of said tube and extending upward within the same, whereby clogging of said expanded mouth through the gathering therein of heavy foreign substances is prevented, substantially as described.

2. In a cotton-seed cleaner, the combination with a vertically-arranged tube, having an enlarged lower portion, said enlarged lower portion being substantially bell-shaped and being formed with a flaring mouth, and means for producing an upward current of air in said tube, of a dirt-receptacle, having an opening in its top, placed under the expanded mouth of said tube and extending upward within the same, whereby clogging of said expanded mouth through the gathering therein of heavy foreign substances is prevented, substantially as described.

3. In a cotton-seed cleaner, the combination with a vertically-arranged tube, having a horizontally-inclined portion, with an opening formed in the bottom thereof, of means for producing an exhaust air-current therein, the paddle-roller M, so journaled that the paddles thereof project only slightly into the tube, the rigid casing N and the valve O, whereby foreign substances carried along the bottom of the tube are removed therefrom, substantially as described.

In testimony whereof I affix my signature in presence of two witnesses.

JAMES J. FAULKNER.

Witnesses:
C. L. BERLIN,
JOHN HALLUM.